(12) United States Patent
Harris et al.

(10) Patent No.: US 11,327,849 B2
(45) Date of Patent: May 10, 2022

(54) CATALOG RESTORATION

(71) Applicant: International Business Machines Corporation, Armonk, NY (US)

(72) Inventors: Eric Harris, Vail, AZ (US); David C. Reed, Tucson, AZ (US); Franklin E. McCune, Tucson, AZ (US); Issak Sanchez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 16/866,978

(22) Filed: May 5, 2020

(65) Prior Publication Data

US 2021/0349789 A1 Nov. 11, 2021

(51) Int. Cl.
*G06F 11/14* (2006.01)
*G06F 16/17* (2019.01)
*G06F 9/54* (2006.01)

(52) U.S. Cl.
CPC .......... *G06F 11/1469* (2013.01); *G06F 9/546* (2013.01); *G06F 11/1451* (2013.01); *G06F 11/1464* (2013.01); *G06F 16/1734* (2019.01); *G06F 2201/80* (2013.01)

(58) Field of Classification Search
CPC .. G06F 11/1469; G06F 9/546; G06F 11/1451; G06F 11/1464; G06F 16/1734; G06F 2201/80; G06F 11/1448
See application file for complete search history.

(56) References Cited

U.S. PATENT DOCUMENTS

| | | | |
|---|---|---|---|
| 6,865,655 B1 * | 3/2005 | Andersen ............ | G06F 11/1453 714/E11.122 |
| 7,158,999 B2 | 1/2007 | Pace et al. | |
| 8,024,519 B2 | 9/2011 | Lehr et al. | |
| 2018/0329919 A1 | 11/2018 | Erdmann et al. | |
| 2019/0087276 A1 | 3/2019 | Dutch et al. | |

OTHER PUBLICATIONS

Mell et al., "The NIST Definition of Cloud Computing", Recommendations of the National Institute of Standards and Technology, Sep. 2011, 7 pages.

* cited by examiner

*Primary Examiner* — David Yi
*Assistant Examiner* — Dustin B. Fulford
(74) *Attorney, Agent, or Firm* — Stosch Sabo

(57) ABSTRACT

A method can include obtaining catalog data of a catalog. The catalog can include one or more records. The method can further include detecting one or more damaged records among the one or more records and isolating the one or more damaged records. The method can further include identifying one or more undamaged records among the one or more records. The method can further include transferring the one or more undamaged records to a backup catalog. The method can further include obtaining a transfer status of a first undamaged record of the one or more undamaged records. The method can further include obtaining an access request corresponding to the first undamaged record. The method can further include determining, based on the transfer status, a response to the access request and generating, based at least in part on the backup catalog, a restored catalog.

20 Claims, 8 Drawing Sheets

CATALOG RESTORATION

BACKGROUND

The present disclosure relates to catalogs for accessing stored electronic data, and more specifically, to catalog restoration.

A catalog can include reference information that can be used to locate electronic data stored on a computer system. For example, a mainframe computer system can include a catalog that is made up of a set of records. Each record of the catalog can include reference information corresponding to a respective data set stored on the mainframe computer system. In some instances, such reference information can include a data set name, data set type, and/or a data set storage location. A user and/or a program application can access a record of the catalog to obtain a physical location of a data set on a storage device, such as a direct access storage device, of the mainframe computer system. After obtaining the physical location of a data set, the user and/or program application can access the data set.

SUMMARY

According to embodiments of the present disclosure, a method can include obtaining catalog data of a catalog. The catalog can include one or more records. The method can further include detecting, based on the catalog data, one or more damaged records among the one or more records. The method can further include isolating the one or more damaged records in response to the detecting the one or more damaged records. The method can further include identifying one or more undamaged records among the one or more records. The method can further include transferring the one or more undamaged records to a backup catalog. The method can further include obtaining a transfer status of a first undamaged record of the one or more undamaged records. The transfer status can be based on the transferring. The method can further include obtaining an access request corresponding to the first undamaged record. The method can further include determining, based on the transfer status, a response to the access request. The method can further include generating, based at least in part on the backup catalog, a restored catalog.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
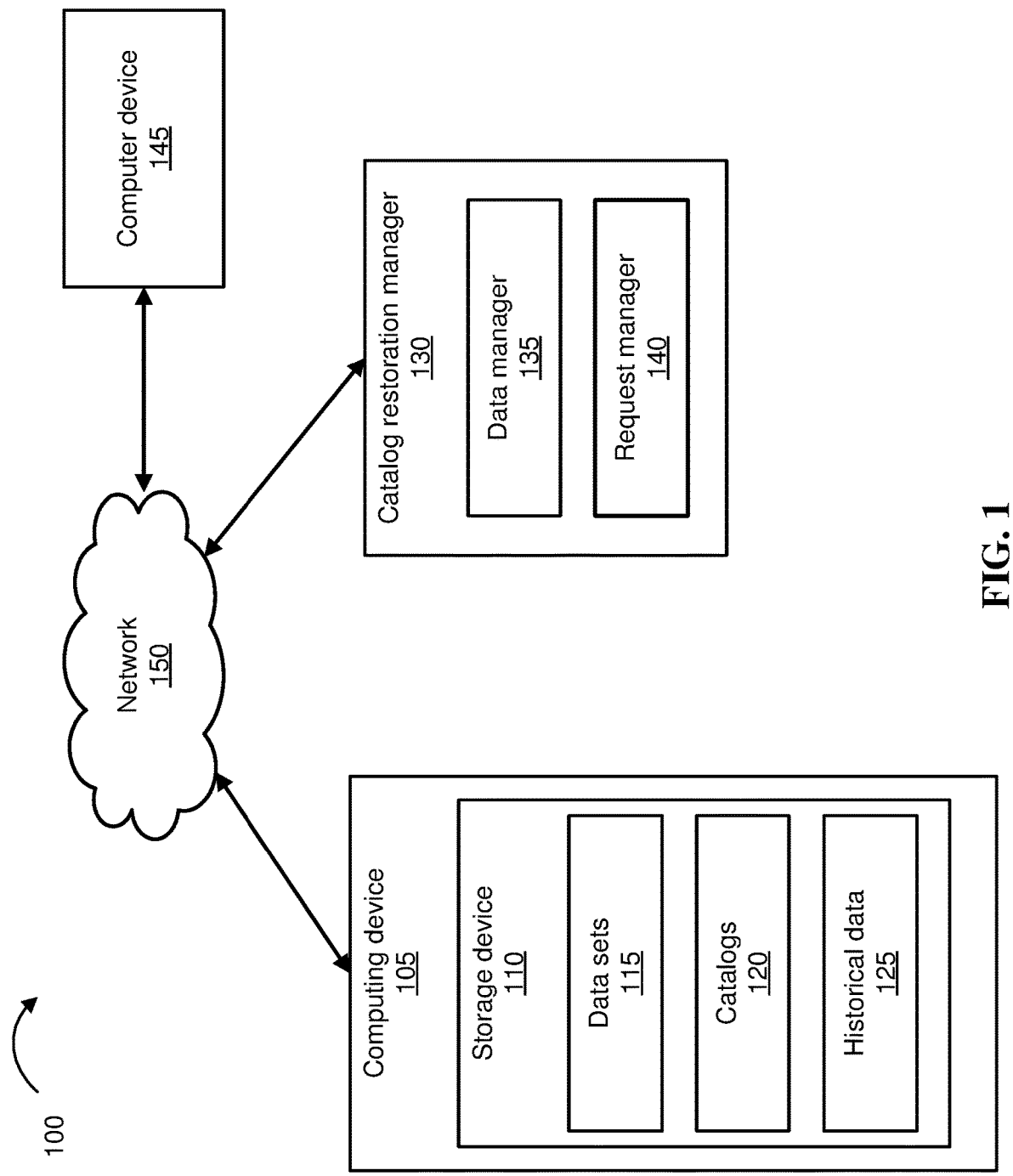
FIG. 1 depicts an example computing environment having a catalog restoration manager, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to catalogs for accessing stored electronic data; more particular aspects relate to catalog restoration. While the present disclosure is not necessarily limited to such applications, various aspects of the disclosure may be appreciated through a discussion of various examples using this context.

A catalog can include reference information that can be used to locate electronic data stored on a computer system. For example, a mainframe computer system can include a catalog that is made up of a set of records. Each record of the catalog can include reference information corresponding to a respective data set stored on the mainframe computer system. In some instances, such reference information can include a data set name, data set type, and/or a data set storage location. A user and/or a program application can access a record of the catalog to obtain a physical location of a data set on a storage device, such as a direct access storage device ("DASD"), of the mainframe computer system. After obtaining the physical location of a data set, the user and/or program application can access the data set.

In some instances, a catalog can become damaged due to an incident such as disk failure of a DASD on which the catalog is stored, a logical error corresponding to the catalog, a rogue program, user error, and the like. A damaged catalog can include one or more damaged records that can malfunction or be inaccessible. In some instances, an attempt by a user and/or a program application to access a damaged catalog can result in a computer system generating one or more error messages. Accordingly, a damaged catalog can block or delay access to one or more data sets, which can create inefficiencies and negatively impact computing operations. Furthermore, in some instances, a damaged catalog can exist undetected until a user and/or a program application attempts to access the damaged catalog. Thus, an identification of a damaged catalog and an effort to address a damaged catalog can be delayed until a time when a functioning catalog is needed.

To address these and other challenges, embodiments of the present disclosure include a catalog restoration manager.

In some embodiments, the catalog restoration manager can proactively detect a damaged catalog and generate a restored catalog in a manner that can reduce delayed access to data sets. More specifically, in some embodiments, the catalog restoration manager can intermittently obtain catalog data and detect, based on the catalog data, the presence of a damaged catalog. Additionally, in some embodiments, the catalog restoration manager can simultaneously isolate damaged records, transfer undamaged records, and manage access to undamaged records. Accordingly, in some embodiments, the catalog restoration manager can perform operations to generate a restored catalog while permitting a user and/or program application to access data sets that correspond to a damaged catalog. Thus, embodiments of the present disclosure can implement an efficient approach to restoring a damaged catalog.

Turning to the figures, FIG. 1 illustrates a computing environment 100 that includes one or more of each of a computing device 105, a catalog restoration manager 130, a computer device 145 and/or a network 150. In some embodiments, at least one computing device 105, catalog restoration manager 130, and/or computer device 145 can exchange data with at least one other through the at least one network 150. For example, in some embodiments, at least one catalog restoration manager 130 can exchange data with at least one computing device 105 through the at least one network 150. One or more of each of the computing device 105, catalog restoration manager 130, computer device 145 and/or network 150 can include a computer system, such as the computer system 601 discussed with respect to FIG. 6.

In some embodiments, the catalog restoration manager 130 can be a software application installed on a computer system of at least one of the computing device 105 and/or the computer device 145. In some embodiments, the catalog restoration manager 130 can be integrated into one or more software applications installed on at least one of the computing device 105 and/or the computer device 145. For example, the catalog restoration manager 130 can be included as a plug-in software component of a software application installed on the computing device 105. The catalog restoration manager 130 can include program instructions implemented by a processor, such as a processor of the computing device 105, to perform one or more operations discussed with respect to FIGS. 2-5.

In some embodiments, the catalog restoration manager 130 can include one or more modules, such as data manager 135 and/or request manager 140. In some embodiments, the data manager 135 and the request manager 140 can be integrated into a single module. In some embodiments, the data manager 135 can obtain, interpret, analyze, store, and/or initiate storage of data. In some embodiments, the request manager 140 can obtain and manage access requests, such as an access request received from computer device 145 to access a catalog 120. In some embodiments, one or more of the data manager 135 and/or the request manager 140 can include program instructions implemented by a processor, such as a processor of the computing device 105, to perform one or more operations discussed with respect to FIGS. 2-5. For example, in some embodiments, the data manager 135 can include program instructions to perform operations 310-340 and 360, FIG. 3 and/or method 500, FIG. 5. In some embodiments, request manager 140 can include program instructions to perform operation 350, FIG. 3 and/or method 400, FIG. 4.

In some embodiments, the computing device 105 can be a device such as a mainframe computer system. In some embodiments, the computing device 105 can include one or more storage devices 110. In some embodiments, the one or more storage devices 110 can include storage media, such as magnetic disks, magnetic tapes, solid state drives ("SSD's"), and/or optical discs, on which one or more data sets 115, one or more catalogs 120, and/or historical data 125 can be stored.

In some embodiments, the computer device 145 can include a device such as a notebook, tablet, and/or desktop computer. In some embodiments, a user of a computer device 145 can access information such as data sets 115, catalogs 120, and/or historical data 125 through the computer device 145.

In some embodiments, the network 150 can be a wide area network (WAN), a local area network (LAN), the Internet, or an intranet. In some embodiments, the network 150 can be substantially similar to, or the same as, cloud computing environment 50 discussed with respect to FIG. 7.

Figure 2:
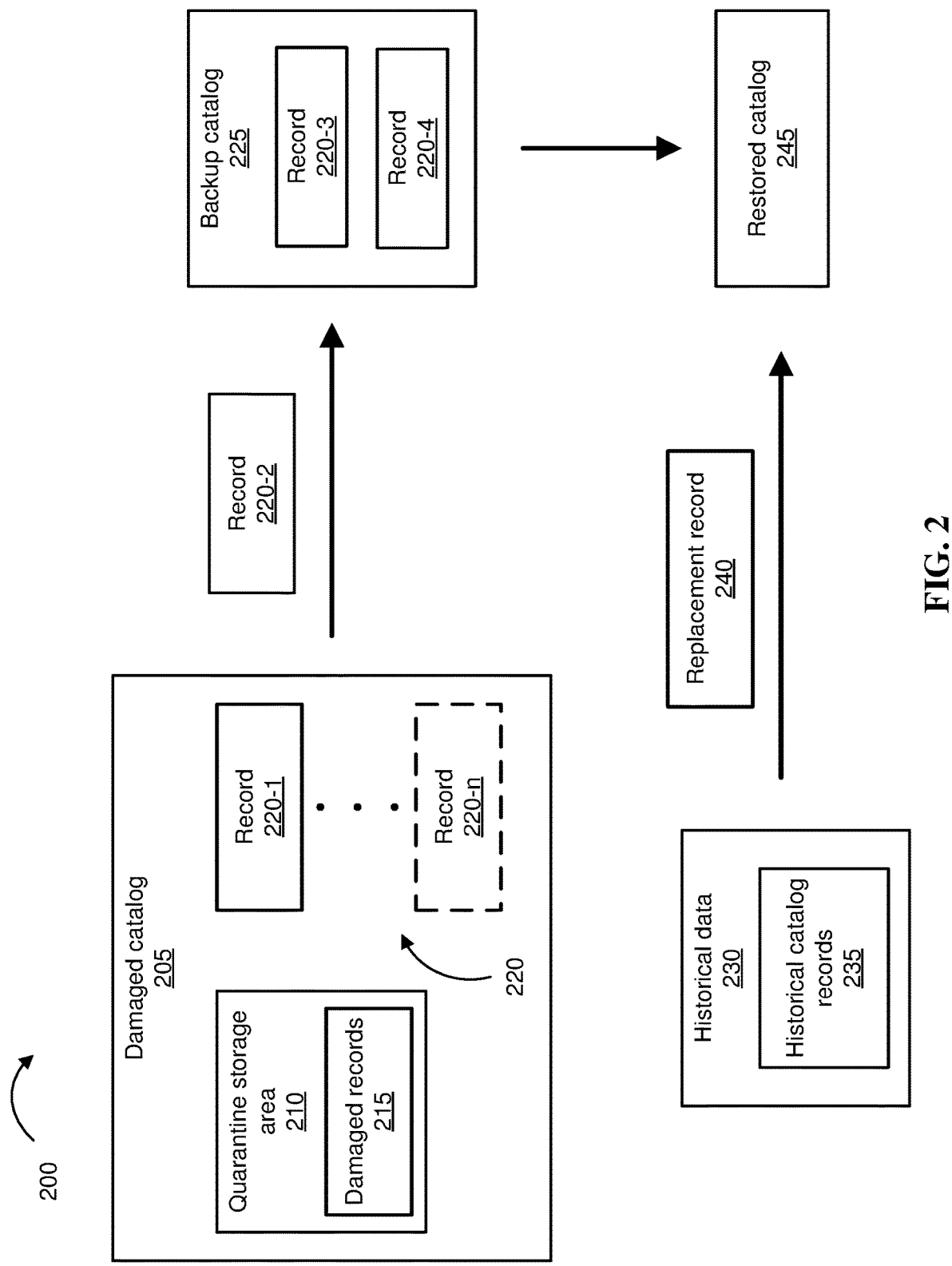
FIG. 2 depicts an example computing environment in which a restored catalog is generated based on a backup catalog and historical data, in accordance with embodiments of the present disclosure.

FIG. 2 illustrates a computing environment 200 in which a restored catalog 245 is generated based on a backup catalog 225 and historical data 230, in accordance with embodiments of the present disclosure. One or more of the operations described with respect to FIG. 2 can be performed by a catalog restoration manager, such as the catalog restoration manager 130, FIG. 1. In some embodiments, the data shown in FIG. 2 (e.g., damaged catalog 205, backup catalog 225, historical data 230, and/or restored catalog 245) can be included on one or more storage devices, such as the one or more storage devices 110, FIG. 1. In some embodiments, the catalog restoration manager can generate the restored catalog 245 by implementing one or more operations of method 400, FIG. 4 and/or method 500, FIG. 5.

Referring back to FIG. 2, computing environment 200 includes a damaged catalog 205, a quarantine storage area 210 for isolating one or more damaged records 215, and a set of records 220. In FIG. 2, the records shown outside of the quarantine storage area 210 are undamaged records (e.g., records that are accessible). The set of records 220 can include one or more records. For example, in some embodiments, the set of records 220 can include n records, where n is an integer greater than zero. For example, n=1 in embodiments in which the set of records 220 includes only a first record 220-1; n=2 in embodiments in which the set of records 220 includes two records (a first record 220-1 and a second record 220-2); and so on. The catalog restoration manager identifies damaged catalog 205 as a damaged catalog because damaged catalog 205 includes one or more damaged records 215.

As discussed in more detail below with respect to FIGS. 3-5, the catalog restoration manager can transfer undamaged records (e.g., records 220-1, 220-2, 220-3, and 220-4) to a backup catalog 225. As shown in FIG. 2, record 220-1 has an "unmoved" transfer status, as record 220-1 has not been moved from the damaged catalog 205 to the backup catalog 225. Additionally, record 220-2 has an "in-transition" transfer status, as the transfer of record 220-2 from the damaged catalog 205 to the backup catalog 225 is in progress. Furthermore, records 220-3 and 220-4 have a "moved" transfer status, as the transfer of records 220-3 and 220-4 from the damaged catalog 205 to the backup catalog 225 has been completed.

In generating the restored catalog 245, the catalog restoration manager can transfer the records of the backup catalog 225 (e.g., records 220-3 and 220-4) to the restored catalog 245. Additionally, in generating the restored catalog 245, the catalog restoration manager can obtain historical data 230 and generate one or more replacement records 240 that correspond, respectively, to the one or more damaged records 215. The one or more replacement records 240, which are undamaged, can serve as substitutes in the restored catalog 245 for the one or more damaged records 215. Accordingly, the restored catalog 245 can serve as an undamaged version of damaged catalog 205. The historical data 230 can include one or more historical catalog records 235. The historical catalog records 235 can be previously stored undamaged versions of the one or more damaged records 215. Thus, the catalog restoration manager can generate the one or more replacement records 240 by copying the one or more historical catalog records 235. Additionally, the catalog restoration manager can transfer the one or more replacement records to the restored catalog 245.

Figure 3:
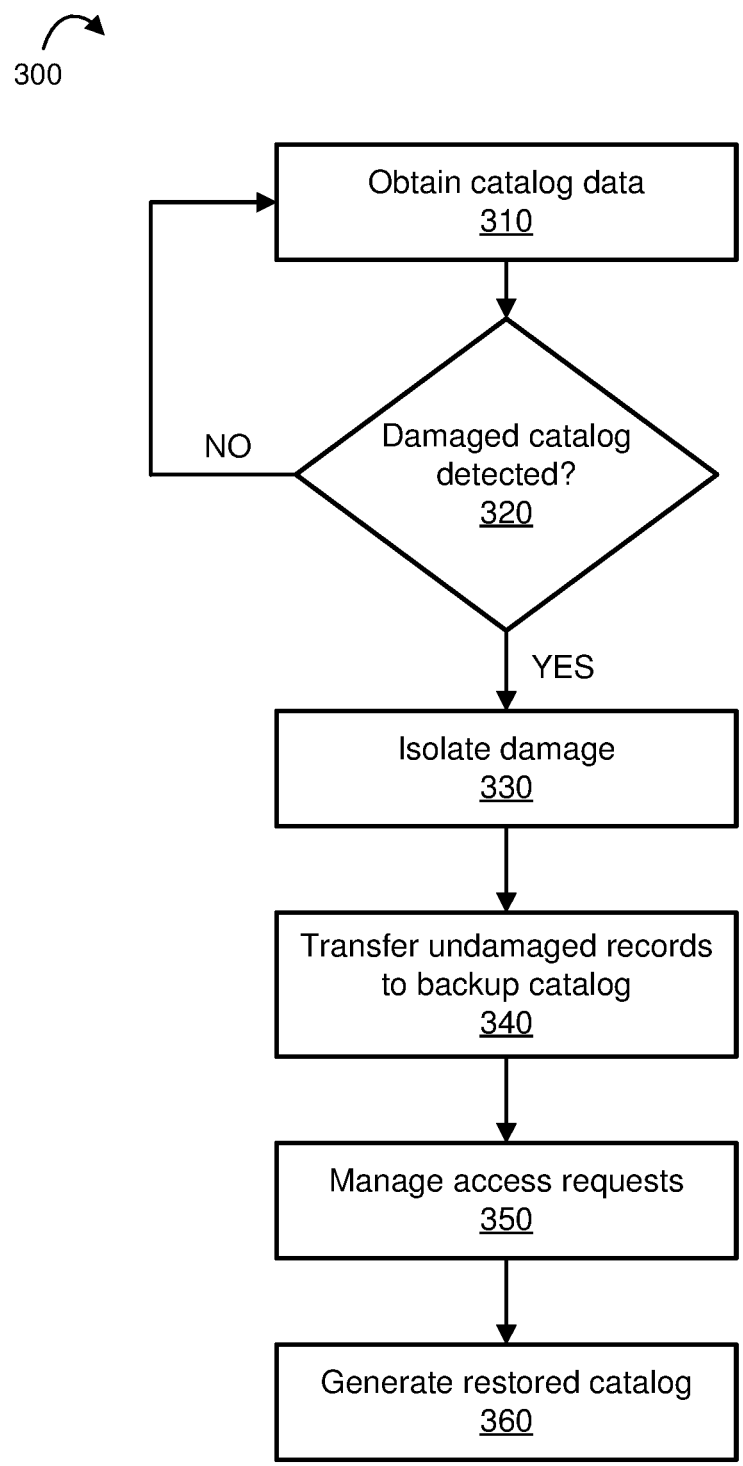
FIG. 3 depicts a flowchart of an example method for detecting a damaged catalog and generating a restored catalog, in accordance with embodiments of the present disclosure.

FIG. 3 illustrates a flowchart of an example method 300 for detecting a damaged catalog and generating a restored catalog, in accordance with embodiments of the present disclosure. The method 300 can be performed by a catalog restoration manager, such as the catalog restoration manager 130, FIG. 1. Method 300 can permit embodiments of the present disclosure to simultaneously isolate damaged records, transfer undamaged records, and manage access to undamaged records. Thus, by method 300, embodiments of the present disclosure can perform operations to generate a restored catalog while permitting a user and/or a program application to access data sets that correspond to a damaged catalog.

Referring back to FIG. 3, in operation 310, the catalog restoration manager can obtain catalog data. In some embodiments, catalog data can include information corresponding to a catalog, such as one or more error messages, condition data (e.g., data regarding whether one or more catalogs, records, control areas, and/or control intervals are damaged or undamaged), and/or whether a catalog is accessible. In some embodiments, the catalog restoration manager can obtain catalog data by monitoring messages (e.g., error messages) generated by a computing device, such as computing device 105, FIG. 1. In some embodiments, the catalog restoration manager can obtain catalog data by monitoring whether a catalog is accessible. In some embodiments, the catalog restoration manager can obtain catalog data by receiving the catalog data from a user and/or from a discrete program application that can monitor the computing device and output catalog data. In some embodiments, the catalog restoration manager can perform operation 310 intermittently or periodically to facilitate proactive detection of damaged catalogs.

In operation 320, the catalog restoration manager can detect, based on the catalog data obtained in operation 310, one or more damaged catalogs. In some embodiments, operation 320 can include the catalog restoration manager detecting one or more damaged control areas, control intervals, and/or records corresponding to a catalog, which result in a damaged catalog. In some embodiments, the catalog restoration manager can detect a damaged catalog by interpreting one or more error messages, such as one or more error messages indicating that a record is corrupted or inaccessible. In some embodiments, the catalog restoration manager can detect a damaged catalog based on the catalog restoration manager's inability to access a catalog, record, and/or data set. In some embodiments, the catalog restoration manager can detect a damaged catalog by interpreting condition data received from a user and/or program application. In some embodiments, operation 320 can include the catalog restoration manager detecting undamaged catalogs and/or records (i.e., catalogs and/or records that are not damaged catalogs and/or records).

If the catalog restoration manager detects one or more damaged catalogs and/or records in operation 320, then the catalog restoration manager can proceed to operation 330. Alternatively, if the catalog restoration manager does not detect one or more damaged catalogs and/or records in operation 320, then the catalog restoration manager can proceed to operation 310.

In operation 330, the catalog restoration manager can isolate the one or more damaged catalogs and/or records detected in operation 320. In some embodiments, isolating a damaged catalog and/or record can include restricting or blocking the ability of a user and/or software application to access to the damaged catalog and/or record. In some embodiments, operation 330 can include restricting or blocking access to one or more control areas and/or control intervals corresponding to a damaged catalog.

In operation 340, the catalog restoration manager can create a backup catalog and transfer one or more undamaged records to the backup catalog. In some embodiments, the catalog restoration manager's employment of a backup catalog can facilitate the catalog restoration manager's ability to manage access requests. Operation 340 can include the catalog restoration manager identifying, or selecting, one or more undamaged records to be transferred to the backup catalog. In some embodiments, transferring one or more undamaged records can include storing the one or more undamaged records in the backup catalog and removing (e.g., deleting) the one or more undamaged records from a damaged catalog. In some embodiments, operation 340 can include the catalog restoration manager generating an indicator of a transfer status (e.g., a "moved" status, an "in-transition" status, or an "unmoved" status) corresponding to the one or more undamaged records.

In operation 350, the catalog restoration manager can manage access requests. An access request can refer to a request by a user and/or a program application to retrieve data from one or more catalogs and/or from one or more records. In some embodiments, operation 350 can include the catalog restoration manager performing one or more operations discussed with respect to the method 400, FIG. 4.

In operation 360, the catalog restoration manager can generate a restored catalog. A restored catalog can refer to a catalog generated based, at least in part, on records of a backup catalog. A restored catalog can replace a damaged catalog. In some embodiments, a restored catalog can be generated based, at least in part, on historical data. In some embodiments, operation 360 can include the catalog restoration manager performing one or more operations discussed with respect to the method 500, FIG. 5.

Figure 4:
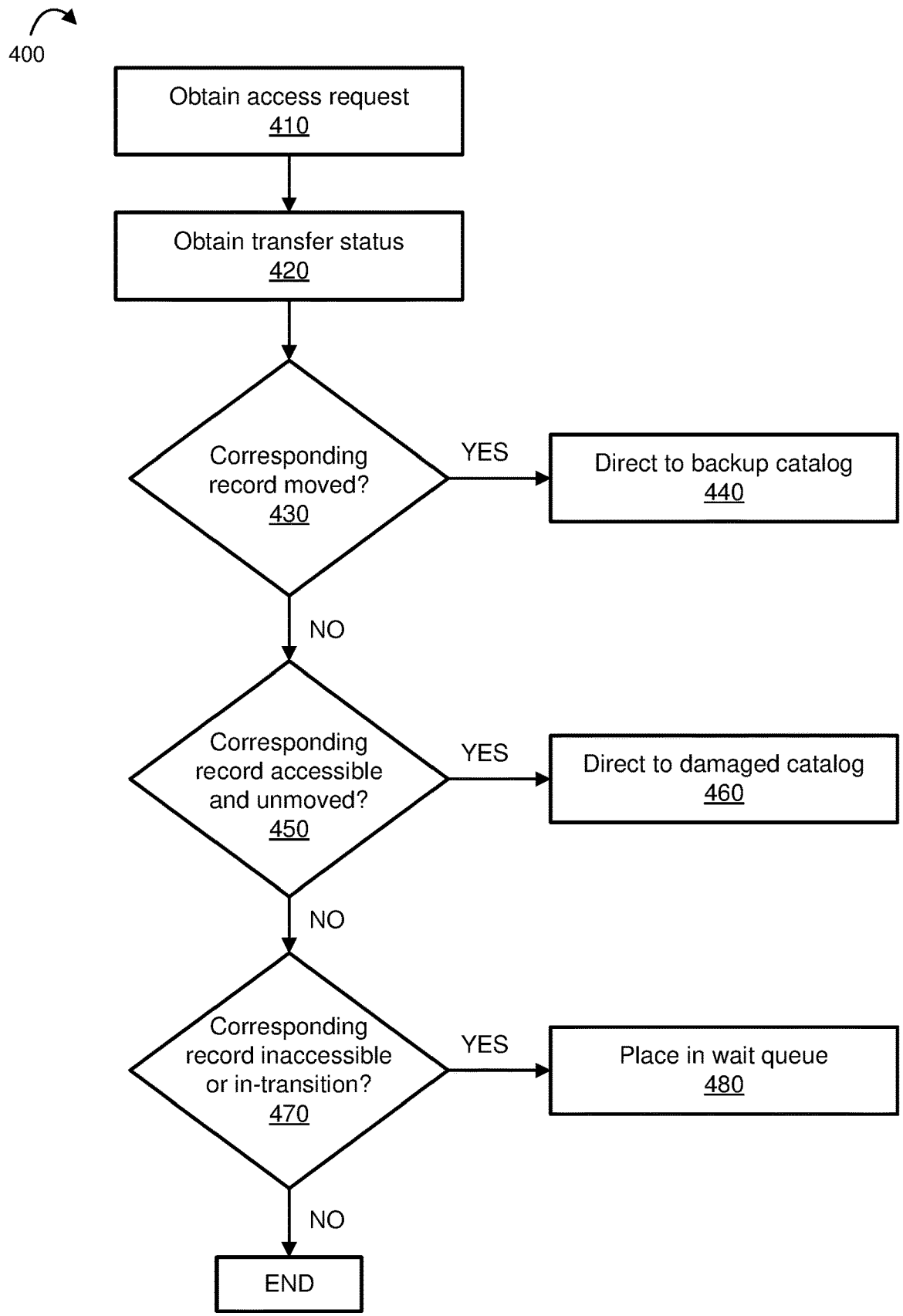
FIG. 4 depicts a flowchart of an example method for managing access requests, in accordance with embodiments of the present disclosure.

FIG. 4 illustrates a flowchart of an example method 400 for managing access requests, in accordance with embodiments of the present disclosure. The method 400 can be performed by a catalog restoration manager, such as the catalog restoration manager 130, FIG. 1. In some embodiments, the catalog restoration manager can perform the method 400 such that the catalog restoration manager can simultaneously (a) permit a user and/or a program application to access one or more data sets that correspond to one or more damaged catalogs and (b) perform operations to generate a restored catalog.

In operation 410, the catalog restoration manager can obtain one or more access requests. In some embodiments, the catalog restoration manager can obtain such access requests from a user and/or a program application. For example, in some embodiments, a user can issue a command to a computer device, such as computer device 145, FIG. 1, to display a data set. In this example, the data set can be stored on a DASD of a mainframe computer system. Continuing with this example, in response to the user's command, a program application of the computer device can generate an access request. The access request can include a request to access a catalog of the mainframe computer system. The catalog can include a record that stores the location of the data set on the DASD, which the computer device needs to display the data set. In this example, the catalog restoration manager can obtain the access request from the program application. Additionally, in this example, the catalog and a record of the catalog can correspond to the data set, as the record of the catalog stores the location of the data set. Additionally in this example, both the catalog and the record of the catalog can correspond to the access request, as the catalog and the record include the location information sought by the access request.

In operation 420, the catalog restoration manager can obtain an indicator (e.g., an annotation or label) of a transfer status of one or more records. In some embodiments, the transfer status can indicate whether a transfer of the one or more records from a damaged catalog to a backup catalog is completed, is in progress, or has not been initiated. For example, in some embodiments, a transfer status of a record can be a "moved" status, an "in-transition" status, or an "unmoved" status, as discussed below.

In operation 430, the catalog restoration manager can determine whether a record corresponding to an access request has a "moved" status. In some embodiments, a moved status can indicate that a transfer of a record from a damaged catalog to a backup catalog is completed. If the record corresponding to the access request has a moved status, then the catalog restoration manager can proceed to operation 440. Alternatively, if the record corresponding to the access request does not have a moved status, then the catalog restoration manager can proceed to operation 450.

In operation 440, the catalog restoration manager can direct the access request to the backup catalog. For example, in some embodiments, the catalog restoration manager can modify a path of the access request such that a requesting entity (e.g., a program application) is directed to the backup catalog to access the record corresponding to the access request.

In operation 450, the catalog restoration manager can determine whether a record corresponding to an access request is accessible (i.e., undamaged) and has an "unmoved" status. In some embodiments, an unmoved status can indicate that a record has not been moved from the damaged catalog to a backup catalog. If the record corresponding to the access request is accessible and has an unmoved status, then the catalog restoration manager can proceed to operation 460. Alternatively, if the record corresponding to the access request is inaccessible (i.e., damaged) or the record does not have an unmoved status, then the catalog restoration manager can proceed to operation 470.

In operation 460, the catalog restoration manager can direct the access request to the damaged catalog. For example, in some embodiments, the catalog restoration manager can permit a path of the access request to remain unmodified, such that a requesting entity (e.g., a program application) is directed to the backup catalog to access the record corresponding to the access request.

In operation 470, the catalog restoration manager can determine whether a record corresponding to an access request is inaccessible (i.e., damaged) or has an "in-transition" status. In some embodiments, an in-transition status can indicate that a transfer of a record from a damaged catalog to a backup catalog is in progress. If the record corresponding to the access request is inaccessible or if the record has an in-transition status, then the catalog restoration manager can proceed to operation 480. Alternatively, the method 400 can end.

In operation 480, the catalog restoration manager can place the access request in a wait queue. For example, in some embodiments, operation 480 can include the catalog restoration manager suspending the access request and permitting the access request to be processed at a later time. For example, in some embodiments, the access request can correspond to a record having an in-transition status. In this example, the catalog restoration manager can suspend the access request (e.g., delay processing of the access request) until the record has a moved status. Continuing with this example, when the record has a moved status, then the catalog restoration manager can modify a path of the access request such that a requesting entity (e.g., a program application) is directed to the backup catalog to access the record.

In another example, in some embodiments, the access request can correspond to a record that is inaccessible (e.g., a record that is damaged and/or isolated). In this example, the catalog restoration manager can suspend the access request until the damaged catalog is restored, as discussed below.

Figure 5:
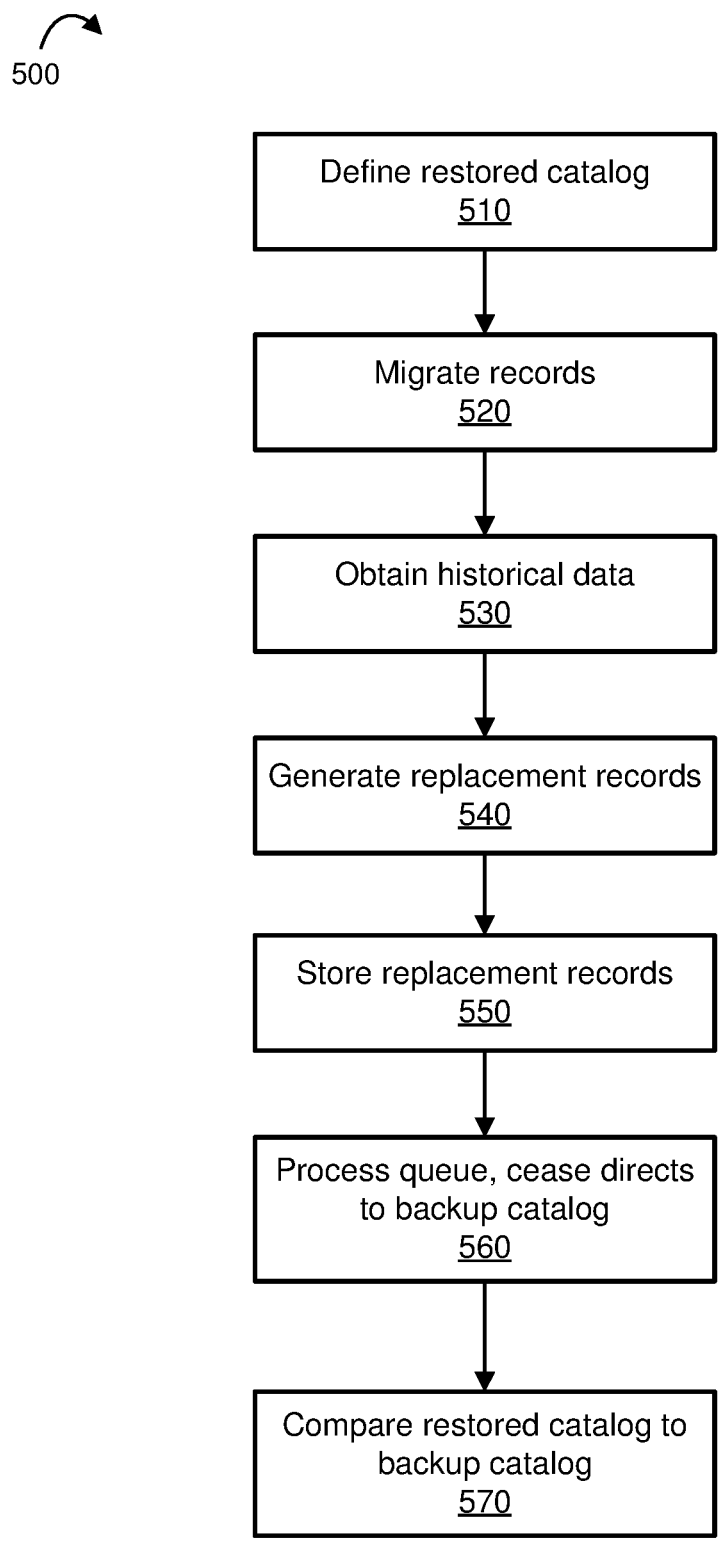
FIG. 5 depicts a flowchart of an example method for generating a restored catalog, in accordance with embodiments of the present disclosure.

FIG. 5 illustrates a flowchart of an example method 500 for generating a restored catalog, in accordance with embodiments of the present disclosure. The method 500 can be performed by a catalog restoration manager, such as the catalog restoration manager 130, FIG. 1.

Referring back to FIG. 5, in operation 510, the catalog restoration manager can define the restored catalog. In some embodiments, defining the restored catalog can include selecting one or more characteristics (e.g., name and/or storage location) such that the restored catalog can replace the damaged catalog. For example, in some embodiments a name and/or storage location selected for the restored catalog can be identical or substantially similar to the name and/or storage location of the damaged catalog. In this way, access requests that would have been directed to the damaged catalog can be directed to the restored catalog. In some embodiments, operation 510 can include the catalog restoration manager deleting the damaged catalog. In some embodiments, operation 510 can include the catalog restoration manager permitting a user and/or a discrete program application to select one or more characteristics of the restored catalog.

In operation 520, the catalog restoration manager can migrate one or more records from the backup catalog to the restored catalog. In some embodiments, migrating one or more records can include the catalog restoration manager generating a copy of one or more records of the backup catalog and storing the copy of the one or more records in the restored catalog.

In operation 530, the catalog restoration manager can obtain historical data. Historical data can include data regarding previous events and processes involving a computing device (e.g., computing device 105, FIG. 1). For example, in some embodiments, historical data can include information such as logs of previous access requests and/or historical catalog records (e.g., copies of one or more records of one or more catalogs).

In operation 540, the catalog restoration manager can generate one or more replacement records. The term "replacement record" can refer to a copy of a historical catalog record that can replace a damaged record. A replacement record can correspond to a damaged record that it replaces. In some embodiments, a replacement record can be substantially similar to the damaged record to which it corresponds, except that the replacement record can be an undamaged record. For example, in some embodiments, the replacement record can store the same location information included in the damaged record, and the replacement record can be an undamaged record.

In operation 550, the catalog restoration manager can store the one or more replacement records generated in operation 540 in the restored catalog.

In operation 560, the catalog restoration manager can process access requests in the wait queue. For example, the catalog restoration manager can process an access request that was suspended because it corresponded to a damaged record. In this example, the catalog restoration manager can direct the access request to a replacement record in the restored catalog. Additionally, in this example, the replacement record corresponds to the damaged record. In some embodiments, operation 560 can include the catalog restoration manager ceasing to direct access requests to the backup catalog.

In operation 570, the catalog restoration manager can compare the restored catalog to the backup catalog. In some embodiments, the comparison can include the catalog restoration manager comparing one or more records of the restored catalog to one or more records of the backup catalog. In this way, the catalog restoration manager can verify that the backup catalog does not include one or more records that are more recently updated than their respective copies migrated in operation 520. In some embodiments, in the case that the backup catalog includes one or more records that are more recently updated than their respective copies in the restored catalog, the catalog restoration manager can migrate the one or more more recently updated records to the restored catalog.

Figure 6:
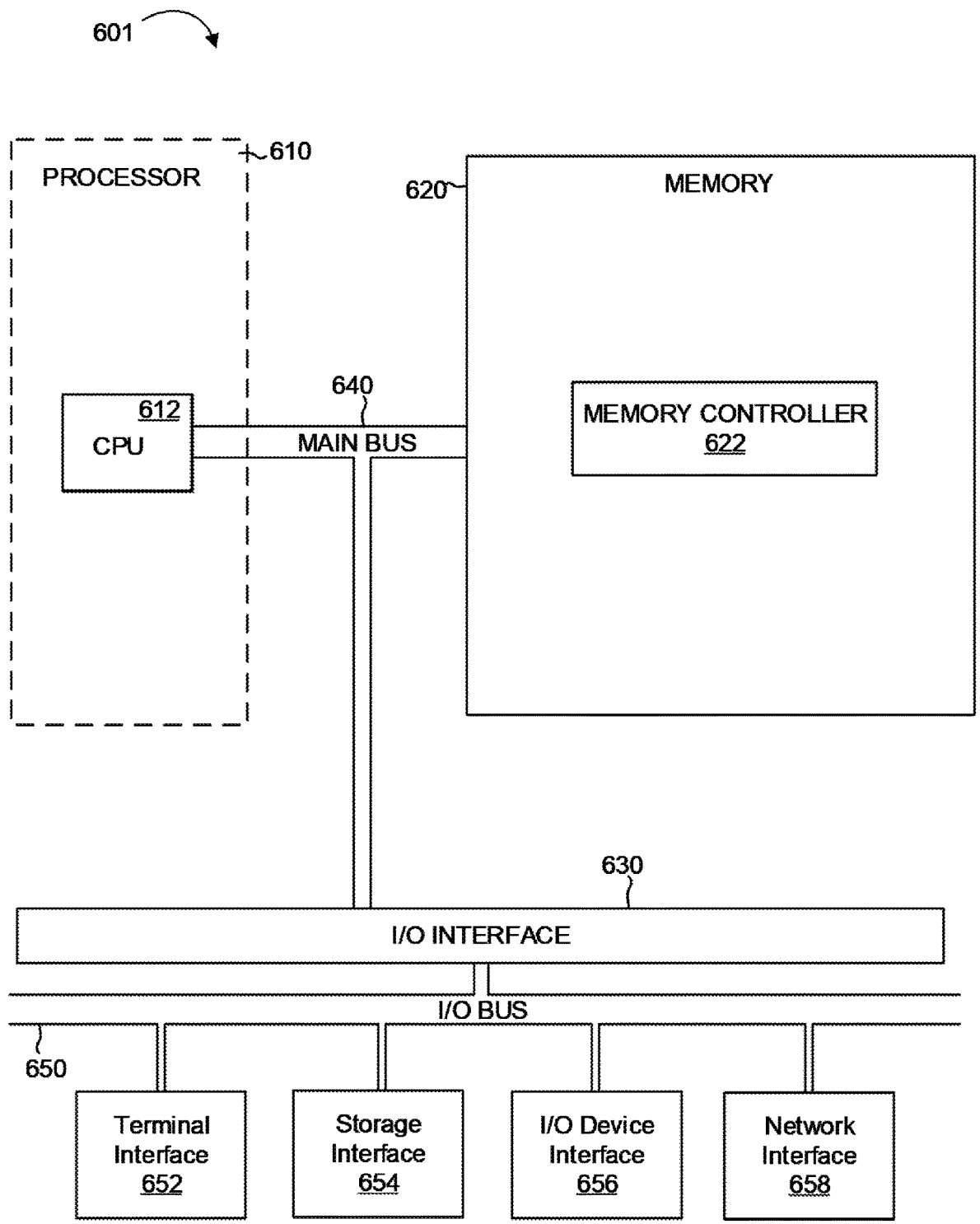
FIG. 6 depicts the representative major components of a computer system that can be used in accordance with embodiments of the present disclosure.

FIG. 6 depicts the representative major components of an exemplary Computer System 601 that can be used in accordance with embodiments of the present disclosure. The particular components depicted are presented for the purpose of example only and are not necessarily the only such variations. The Computer System 601 can comprise a Processor 610, Memory 620, an Input/Output Interface (also referred to herein as I/O or I/O Interface) 630, and a Main Bus 640. The Main Bus 640 can provide communication pathways for the other components of the Computer System 601. In some embodiments, the Main Bus 640 can connect to other components such as a specialized digital signal processor (not depicted).

The Processor 610 of the Computer System 601 can be comprised of one or more CPUs 612. The Processor 610 can additionally be comprised of one or more memory buffers or caches (not depicted) that provide temporary storage of instructions and data for the CPU 612. The CPU 612 can perform instructions on input provided from the caches or from the Memory 620 and output the result to caches or the Memory 620. The CPU 612 can be comprised of one or more circuits configured to perform one or methods consistent with embodiments of the present disclosure. In some embodiments, the Computer System 601 can contain multiple Processors 610 typical of a relatively large system. In other embodiments, however, the Computer System 601 can be a single processor with a singular CPU 612.

The Memory 620 of the Computer System 601 can be comprised of a Memory Controller 622 and one or more memory modules for temporarily or permanently storing data (not depicted). In some embodiments, the Memory 620 can comprise a random-access semiconductor memory, storage device, or storage medium (either volatile or non-volatile) for storing data and programs. The Memory Controller 622 can communicate with the Processor 610, facilitating storage and retrieval of information in the memory modules. The Memory Controller 622 can communicate with the I/O Interface 630, facilitating storage and retrieval of input or output in the memory modules. In some embodiments, the memory modules can be dual in-line memory modules.

The I/O Interface 630 can comprise an I/O Bus 650, a Terminal Interface 652, a Storage Interface 654, an I/O Device Interface 656, and a Network Interface 658. The I/O Interface 630 can connect the Main Bus 640 to the I/O Bus 650. The I/O Interface 630 can direct instructions and data from the Processor 610 and Memory 620 to the various interfaces of the I/O Bus 650. The I/O Interface 630 can also direct instructions and data from the various interfaces of the I/O Bus 650 to the Processor 610 and Memory 620. The various interfaces can comprise the Terminal Interface 652, the Storage Interface 654, the I/O Device Interface 656, and the Network Interface 658. In some embodiments, the various interfaces can comprise a subset of the aforementioned interfaces (e.g., an embedded computer system in an industrial application may not include the Terminal Interface 652 and the Storage Interface 654).

Logic modules throughout the Computer System 601— including but not limited to the Memory 620, the Processor 610, and the I/O Interface 630—can communicate failures and changes to one or more components to a hypervisor or operating system (not depicted). The hypervisor or the operating system can allocate the various resources available in the Computer System 601 and track the location of data in Memory 620 and of processes assigned to various CPUs 612. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
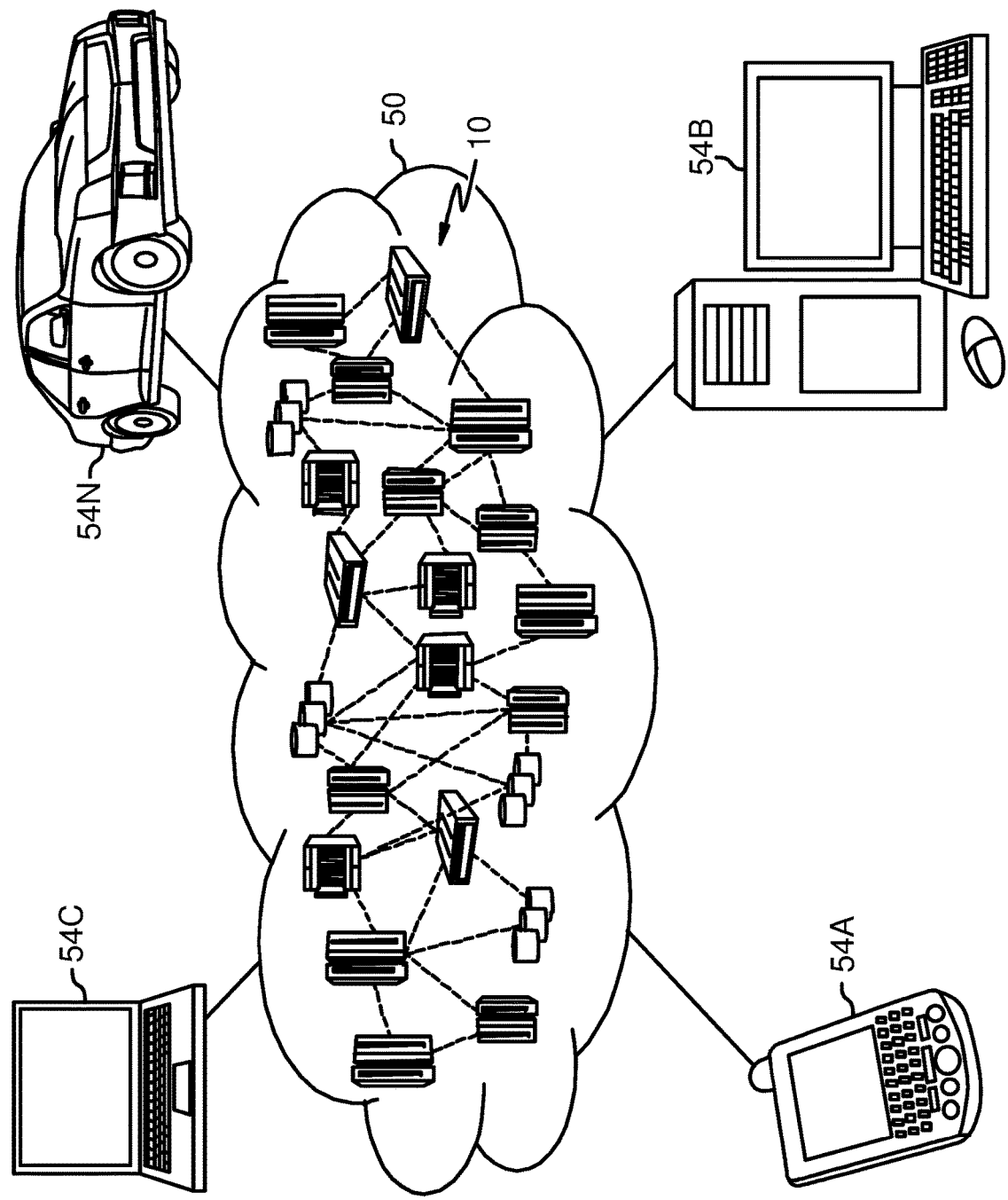
FIG. 7 depicts a cloud computing environment according to embodiments of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
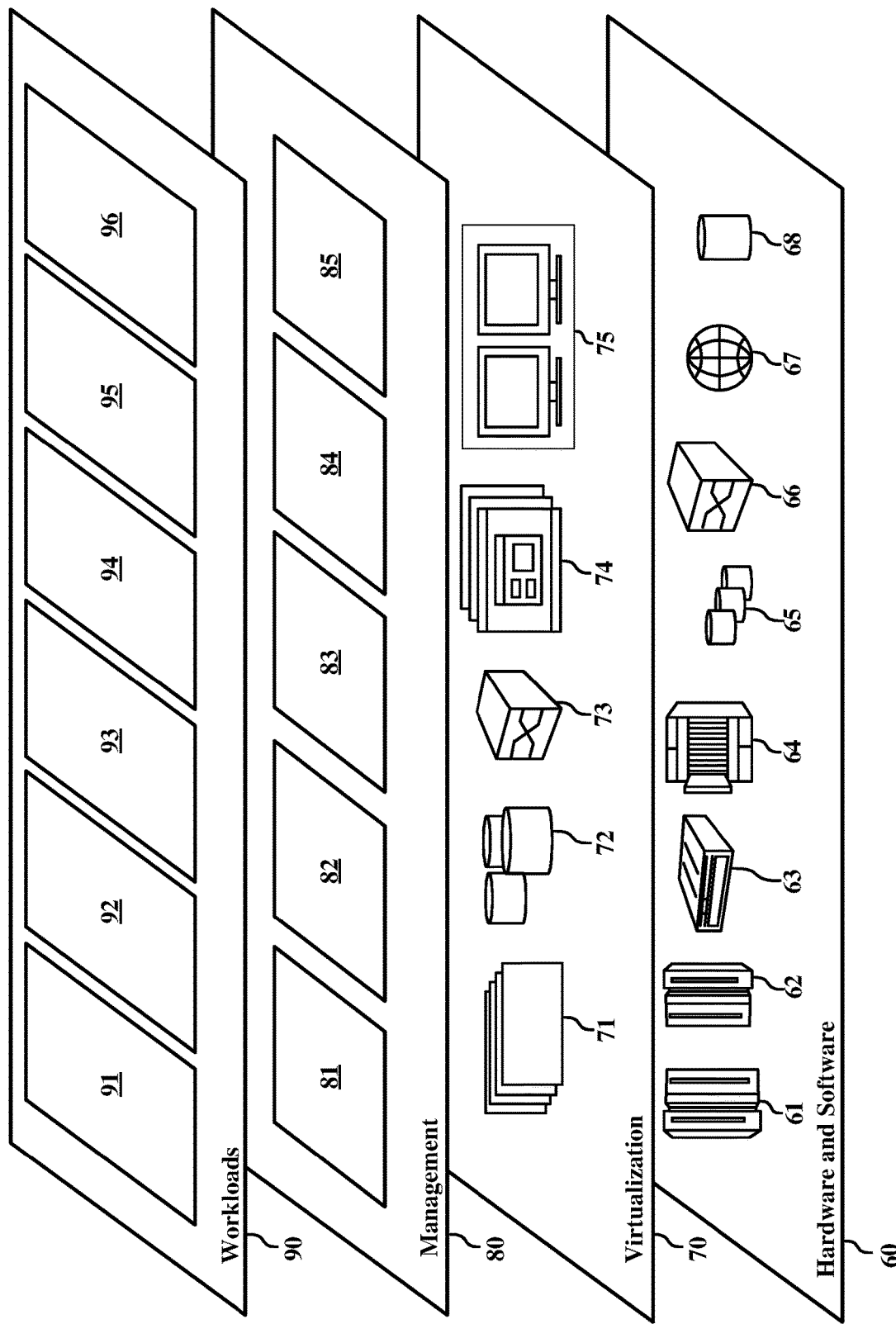
FIG. 8 depicts abstraction model layers according to embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and catalog restoration logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining catalog data of a catalog, the catalog including one or more records;
detecting, based on the catalog data, one or more damaged records among the one or more records;
isolating the one or more damaged records in response to the detecting the one or more damaged records;
identifying one or more undamaged records among the one or more records;
transferring the one or more undamaged records to a backup catalog;
obtaining a transfer status of a first undamaged record of the one or more undamaged records, the transfer status based on the transferring;
obtaining an access request corresponding to the first undamaged record;
determining, based on the transfer status, a response to the access request; and
generating, based at least in part on the backup catalog, a restored catalog.

2. The computer-implemented method of claim 1, wherein the transfer status is a moved status; and
wherein the response to the access request comprises directing the access request to the backup catalog.

3. The computer-implemented method of claim 1, wherein the transfer status is an unmoved status; and
wherein the response to the access request comprises directing the access request to the catalog.

4. The computer-implemented method of claim 1, wherein the transfer status is an in-transition status; and
wherein the response to the access request comprises placing the access request in a wait queue.

5. The computer-implemented method of claim 1, wherein the generating the restored catalog comprises:
defining the restored catalog to replace the catalog; and
migrating the one or more undamaged records from the backup catalog to the restored catalog.

6. The computer-implemented method of claim 5, wherein the generating the restored catalog further comprises:
obtaining historical catalog records;
generating, based on the historical catalog records, one or more replacement records corresponding, respectively, to the one or more damaged records; and
storing the one or more replacement records in the restored catalog.

7. The computer-implemented method of claim 6, wherein the generating the restored catalog further comprises comparing the restored catalog to the backup catalog.

8. A system comprising:
a processor; and
a memory in communication with the processor, the memory containing program instructions that, when executed by the processor, are configured to cause the processor to perform a method, the method comprising:
obtaining catalog data of a catalog, the catalog including one or more records;
detecting, based on the catalog data, one or more damaged records among the one or more records;
isolating the one or more damaged records in response to the detecting the one or more damaged records;
identifying one or more undamaged records among the one or more records;
transferring the one or more undamaged records to a backup catalog;
obtaining a transfer status of a first undamaged record of the one or more undamaged records, the transfer status based on the transferring;
obtaining an access request corresponding to the first undamaged record;
determining, based on the transfer status, a response to the access request; and
generating, based at least in part on the backup catalog, a restored catalog.

9. The system of claim 8, wherein the transfer status is a moved status; and
wherein the response to the access request comprises directing the access request to the backup catalog.

10. The system of claim 8, wherein the transfer status is an unmoved status; and
wherein the response to the access request comprises directing the access request to the catalog.

11. The system of claim 8, wherein the transfer status is an in-transition status; and
wherein the response to the access request comprises placing the access request in a wait queue.

12. The system of claim 8, wherein the generating the restored catalog comprises:
defining the restored catalog to replace the catalog; and
migrating the one or more undamaged records from the backup catalog to the restored catalog.

13. The system of claim 12, wherein the generating the restored catalog further comprises:
obtaining historical catalog records;
generating, based on the historical catalog records, one or more replacement records corresponding, respectively, to the one or more damaged records; and
storing the one or more replacement records in the restored catalog.

14. The system of claim 13, wherein the generating the restored catalog further comprises comparing the restored catalog to the backup catalog.

15. A computer program product comprising a computer readable storage medium having program instructions embodied therewith, the program instructions executable by a processor to cause the processor to perform a method, the method comprising:
obtaining catalog data of a catalog, the catalog including one or more records;
detecting, based on the catalog data, one or more damaged records among the one or more records;
isolating the one or more damaged records in response to the detecting the one or more damaged records;

identifying one or more undamaged records among the one or more records;

transferring the one or more undamaged records to a backup catalog;

obtaining a transfer status of a first undamaged record of the one or more undamaged records, the transfer status based on the transferring;

obtaining an access request corresponding to the first undamaged record;

determining, based on the transfer status, a response to the access request; and generating, based at least in part on the backup catalog, a restored catalog.

16. The computer program product of claim 15, wherein the transfer status is a moved status; and wherein the response to the access request comprises directing the access request to the backup catalog.

17. The computer program product of claim 15, wherein the transfer status is an unmoved status; and wherein the response to the access request comprises directing the access request to the catalog.

18. The computer program product of claim 15, wherein the transfer status is an in-transition status; and wherein the response to the access request comprises placing the access request in a wait queue.

19. The computer program product of claim 15, wherein the generating the restored catalog comprises:

defining the restored catalog to replace the catalog; and migrating the one or more undamaged records from the backup catalog to the restored catalog.

20. The computer program product of claim 19, wherein the generating the restored catalog further comprises:

obtaining historical catalog records;

generating, based on the historical catalog records, one or more replacement records corresponding, respectively, to the one or more damaged records; and storing the one or more replacement records in the restored catalog.

* * * * *